(12) United States Patent
Munsell et al.

(10) Patent No.: US 10,731,563 B2
(45) Date of Patent: Aug. 4, 2020

(54) COMPRESSED AIR BLEED SUPPLY FOR BUFFER SYSTEM

(71) Applicant: United Technologies Corporation, Farmington, CT (US)

(72) Inventors: Peter M. Munsell, Granby, CT (US); Philip S. Stripinis, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 243 days.

(21) Appl. No.: 15/882,058

(22) Filed: Jan. 29, 2018

(65) Prior Publication Data

US 2018/0149088 A1    May 31, 2018

Related U.S. Application Data

(60) Division of application No. 14/246,260, filed on Apr. 7, 2014, now Pat. No. 9,879,602, which is a
(Continued)

(51) Int. Cl.
*F02C 1/00* (2006.01)
*F02C 7/18* (2006.01)
(Continued)

(52) U.S. Cl.
CPC .............. *F02C 7/18* (2013.01); *F01D 25/183* (2013.01); *F01D 25/22* (2013.01); *F02C 6/08* (2013.01);
(Continued)

(58) Field of Classification Search
CPC ..................................... F02C 6/08; F02C 9/18
See application file for complete search history.

(56) References Cited

U.S. PATENT DOCUMENTS 2,258,792 A    4/1941 New
2,936,655 A    5/1960 Peterson et al.
(Continued)

FOREIGN PATENT DOCUMENTS

EP    0127562    5/1984
EP    0791383    8/1997
(Continued)

OTHER PUBLICATIONS

Honeywell LF507. Jane's Aero-engines, Aero-engines—Turbofan. Feb. 9, 2012.
(Continued)

*Primary Examiner* — Gerald L Sung
(74) *Attorney, Agent, or Firm* — Carlson, Gaskey & Olds, P.C.

(57) ABSTRACT

A method of designing a buffer system for a gas turbine engine according to an example of the present disclosure includes, among other things, configuring a heat exchanger to define a first inlet and a first outlet fluidly coupled to each other and a second inlet and a second outlet fluidly coupled to each other, configuring the first inlet to receive air from first and second air sources that are selectively fluidly coupled to the first inlet, configuring the second inlet to receive air from a third air source fluidly that is coupled to the second inlet, and configuring the first outlet to provide cooled pressurized air to multiple fluid-supplied areas that are located remotely from one another and that are fluidly coupled to the first outlet, the multiple fluid-supplied areas including a bearing compartment of a gas turbine engine.

15 Claims, 2 Drawing Sheets

Related U.S. Application Data continuation of application No. 13/362,499, filed on Jan. 31, 2012, now abandoned.

(51) Int. Cl.
  *F01D 25/18* (2006.01)
  *F01D 25/22* (2006.01)
  *F02C 6/08* (2006.01)

(52) U.S. Cl.
  CPC ............ *F02C 7/185* (2013.01); *Y02T 50/675* (2013.01); *Y10T 29/49359* (2015.01)

(56) References Cited

U.S. PATENT DOCUMENTS

| | | | |
|---|---|---|---|
| 3,021,731 A | 2/1962 | Stoeckicht |
| 3,194,487 A | 7/1965 | Tyler et al. |
| 3,273,340 A | 9/1966 | Hull, Jr. |
| 3,287,906 A | 11/1966 | McCormick |
| 3,352,178 A | 11/1967 | Lindgren et al. |
| 3,412,560 A | 11/1968 | Gaubatz |
| 3,487,993 A | 1/1970 | Rannenberg |
| 3,527,054 A | 9/1970 | Hemsworth |
| 3,747,343 A | 7/1973 | Rosen |
| 3,754,484 A | 8/1973 | Roberts |
| 3,820,719 A | 6/1974 | Clark |
| 3,842,597 A | 10/1974 | Ehrich |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 4,130,872 A | 12/1978 | Harloff |
| 4,284,174 A | 8/1981 | Salvana et al. |
| 4,478,551 A | 10/1984 | Honeycutt, Jr. et al. |
| 4,542,623 A | 9/1985 | Hovan et al. |
| 4,550,561 A | 11/1985 | Coffinberry |
| 4,574,584 A | 3/1986 | Hovan |
| 4,645,415 A | 2/1987 | Hovan et al. |
| 4,649,114 A | 3/1987 | Miltenburger et al. |
| 4,696,156 A | 9/1987 | Burr et al. |
| 4,709,880 A | 12/1987 | Bradfield et al. |
| 4,979,362 A | 12/1990 | Vershure, Jr. |
| 5,102,379 A | 4/1992 | Pagluica et al. |
| 5,141,400 A | 8/1992 | Murphy et al. |
| 5,305,616 A | 4/1994 | Coffinberry |
| 5,317,877 A | 6/1994 | Stuart |
| 5,414,992 A | 5/1995 | Glickstein |
| 5,433,674 A | 7/1995 | Sheridan et al. |
| 5,447,411 A | 9/1995 | Curley et al. |
| 5,466,198 A | 11/1995 | McKibbin et al. |
| 5,524,847 A | 6/1996 | Brodell et al. |
| 5,581,996 A | 12/1996 | Koch et al. |
| 5,677,060 A | 10/1997 | Terentieva et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,035,627 A | 3/2000 | Liu |
| 6,223,616 B1 | 5/2001 | Sheridan |
| 6,305,156 B1 | 10/2001 | Lui |
| 6,315,815 B1 | 11/2001 | Spadaccini et al. |
| 6,318,070 B1 | 11/2001 | Rey et al. |
| 6,387,456 B1 | 5/2002 | Eaton, Jr. et al. |
| 6,412,270 B1 | 7/2002 | Mortzheim et al. |
| 6,517,341 B1 | 2/2003 | Brun et al. |
| 6,607,165 B1 | 8/2003 | Manteiga et al. |
| 6,709,492 B1 | 3/2004 | Spadaccini et al. |
| 6,732,502 B2 | 5/2004 | Seda et al. |
| 6,814,541 B2 | 11/2004 | Evans et al. |
| 7,021,042 B2 | 4/2006 | Law |
| 7,328,580 B2 | 2/2008 | Lee et al. |
| 7,334,392 B2 | 2/2008 | Moniz et al. |
| 7,374,403 B2 | 5/2008 | Decker et al. |
| 7,591,631 B2 | 9/2009 | Hendricks et al. |
| 7,591,754 B2 | 9/2009 | Duong et al. |
| 7,662,059 B2 | 2/2010 | McCune |
| 7,694,505 B2 | 4/2010 | Schilling |
| 7,806,651 B2 | 10/2010 | Kennepohl et al. |
| 7,824,305 B2 | 11/2010 | Duong et al. |
| 7,926,260 B2 | 4/2011 | Sheridan et al. |
| 7,997,868 B1 | 8/2011 | Liang et al. |
| 8,074,440 B2 | 12/2011 | Kohlenberg et al. |
| 8,205,432 B2 | 6/2012 | Sheridan |
| 2006/0213202 A1 | 9/2006 | Fukutani |
| 2008/0003096 A1 | 1/2008 | Kohli et al. |
| 2008/0116009 A1 | 5/2008 | Sheridan et al. |
| 2008/0310956 A1 | 12/2008 | Jain |
| 2008/0317588 A1 | 12/2008 | Grabowski et al. |
| 2009/0056343 A1 | 3/2009 | Suciu et al. |
| 2009/0293445 A1 | 12/2009 | Ress, Jr. |
| 2010/0092116 A1 | 4/2010 | Franconi |
| 2010/0105516 A1 | 4/2010 | Sheridan et al. |
| 2010/0148396 A1 | 6/2010 | Xie et al. |
| 2010/0192593 A1 | 8/2010 | Brown |
| 2010/0212281 A1 | 8/2010 | Sheridan |
| 2010/0218483 A1 | 9/2010 | Smith |
| 2010/0331139 A1 | 12/2010 | McCune |
| 2011/0159797 A1 | 6/2011 | Beltman et al. |
| 2011/0203293 A1 | 8/2011 | Giahn |
| 2011/0293423 A1 | 12/2011 | Bunker et al. |
| 2012/0124964 A1 | 5/2012 | Hasel et al. |
| 2013/0133334 A1 | 5/2013 | Strecker et al. |

FOREIGN PATENT DOCUMENTS

| | | |
|---|---|---|
| EP | 1142850 | 10/2001 |
| GB | 1516041 | 6/1978 |
| GB | 2041090 | 9/1980 |
| GB | 2152148 | 7/1985 |
| GB | 2426792 | 12/2006 |
| WO | 2007038674 | 4/2007 |

OTHER PUBLICATIONS

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8). Start p. 32.

Hendricks, E.S. and Tong, M.T. (2012). Performance and weight estimates for an advanced open rotor engine. NASA/TM-2012-217710. pp. 1-13.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Zalud, T. (1998). Gears put a new spin on turbofan performance. Machine Design, 70(20), p. 104.

Kurzke, J. (2008). Preliminary Design, Aero-engine design: From state of the art turbofans towards innovative architectures. pp. 1-72.

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 3-12, 2009, Orlando, Florida, USA. pp. 1-12.

Han, J., Dutta, S., and Ekkad, S.V. (2000). Gas turbine heat transfer and cooling technology. New York, NY: Taylor & Francis. pp. 1-25, 129-157, and 160-249.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 582-685, 697-699, 703-705, 802-805, 862-864, and 923-925.

Declaration of Reza Abhari, Ph.D. In re U.S. Pat. No. 8,844,265. Executed Jun. 28, 2016. pp. 1-91.

(56) References Cited

OTHER PUBLICATIONS

Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. dated Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. dated Feb. 27, 2003.. p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28(9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76(1). pp. 3-28.

Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/3iC composites with Si-MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 855-860.
Bunker, R.S. (2005). A review of shaped hole turbine film-cooling technology. Journal of Heat Transfer vol. 127. Apr. 2005. pp. 441-453.
International Search Report and Written Opinion for International Application No. PCT/US2013020746 completed dated Aug. 29, 2013.
Extended European Search Report for European Application No. 13768600.2 dated Nov. 12, 2015.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-31.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Baker, R.W. (2000). Membrane technology and applications. New York, NY: McGraw-Hill. pp. 87-153.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.

(56) References Cited

OTHER PUBLICATIONS

Darrah, S. (1987). Jet fuel deoxygenation. Interim Report for Period Mar. 1987-Jul. 1988. pp. 1-22.

Bucknell, R.L. (1973). Influence of fuels and lubricants on turbine engine design and performance, fuel and lubricant analyses. Final Technical Report, Mar. 1971-Mar. 1973. pp. 1-252.

Hazlett, R.N. (1991). Thermal oxidation stability of aviation turbine fuels. Philadelphia, PA: ASTM. pp. 1-163.

Taylor, W.F. (1974). Deposit formation from deoxygenated hydrocarbons. I. General features. Ind. Eng. Chem., Prod. Res. Develop., vol. 13(2). 1974. pp. 133-38.

Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.

Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.

Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.

Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.

Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.

Edwards, T. and Zabarnick, S. (1993). Supercritical fuel deposition mechanisms. Ind. Eng. Chem. Res. vol. 32. 1993. pp. 3117-3122.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.

Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Technical Data. Teflon. WS Hampshire Inc. Retrieved from: http://catalog.wshampshire.com/Asset/psg_teflon_pffe.pdf.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Edkins, D.P., Hirschkron, R., and Lee, R. (1972). TF34 turbofan quiet engine study. Final Report prepared for NASA. NASA-CR-120914. Jan. 1, 1972. pp. 1-99.

Waters, M.N. and Schairer, E.T. (1977). Analysis of turbofan propulsion system weight and dimensions. NASA Technical Memorandum. Jan. 1977. pp. 1-65.

Meyer, A.G. (1988). Transmission development of TEXTRON Lycoming's geared fan engine. Technical Paper. Oct. 1988. pp. 1-12.

Dudley, D.W., Ed. (1962). Gear handbook. New York, NY: McGraw-Hill. pp. 14-17 (TOC, Preface, and Index).

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Gates, D. Bombardier flies at higher market. Seattle Times. Jul. 13, 2008. pp. C6.

Decker, S. and Clough, R. (2016). Ge wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

Drago, R.J. (1974). Heavy-lift helicopter brings up drive ideas. Power Transmission Design. Mar. 1987. pp. 1-15.

Krantz, T.L. (1990). Experimental and analytical evaluation of efficiency of helicopter planetary stage. NASA Technical Paper. Nov. 1990. pp. 1-19.

Heingartner, P., MBA, D., Brown, D. (2003). Determining power losses in the helical gear mesh; Case Study ASME 2003 Design Engineering Technical Conferences. Chicago, IL. Sep. 2-6, 2003. pp. 1-7.

Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.

Reshotko, M., Karchmer, A., Penko, P.F. (1977). Core noise measurements on a YF-102 turbofan engine Prepared for Aerospace Sciences Meeting sponsored by the American Institute of Aeronautics and Astronautics. Jan. 24-26, 2977.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-151.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.G., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

(56) References Cited

OTHER PUBLICATIONS

Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, fith Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.

COMPRESSED AIR BLEED SUPPLY FOR BUFFER SYSTEM

CROSS-REFERENCE TO RELATED APPLICATION

This application is a divisional of U.S. application Ser. No. 14/246,260, filed Apr. 7, 2014, which is a continuation of U.S. application Ser. No. 13/362,499, filed Jan. 31, 2012.

BACKGROUND

This disclosure relates to a buffer system for a gas turbine engine.

Gas turbine engines typically require air from one of the compressor stages to provide buffer air to a bearing compartment, for example. One proposed system utilizes a valve in the buffer system that regulates the fluid flow from a high compressor stage and a low compressor stage. The regulated air is provided to a cooler and a bearing compartment.

Another system utilizes a dedicated centrifugal compressor to provide pressurized air to multiple bearing compartments and provide shaft ventilation. The centrifugal compressor is a separate compressor, discrete from the high pressure and low pressure compressor stages of the gas turbine engine.

SUMMARY

A gas turbine engine according to an example of the present disclosure includes a fan, a compressor section fluidly connected to the fan, a combustor fluidly connected to the compressor section, a turbine section fluidly connected to the combustor, and a buffer system. The buffer system includes a heat exchanger having a first inlet, a first outlet, a second inlet, and a second outlet. The first outlet is configured to provide a cooled pressurized fluid, first and second air sources that are selectively fluidly coupled to the first inlet, a third air source fluidly coupled to the second inlet, and multiple fluid-supplied areas located remotely from one another and fluidly coupled to the first outlet. The multiple fluid-supplied areas include a bearing compartment.

A further embodiment of any of the foregoing embodiments includes a first compressor and a second compressor. The second air source is provided by the second compressor, and the third air source is provided by the first compressor.

In a further embodiment of any of the foregoing embodiments, the first, second and third air sources are different than one another.

In a further embodiment of any of the foregoing embodiments, the first air source is configured to provide air at a first pressure and temperature state, and the second air source is configured to provide air at a higher pressure and temperature state than the first air source.

In a further embodiment of any of the foregoing embodiments, a valve is fluidly coupled to at least one of the first and second air sources. The valve is configured to regulate fluid flow from at least one of the one first and second air sources to the heat exchanger.

In a further embodiment of any of the foregoing embodiments, a mid-stage is provided fluidly between the first and second compressors. The first air source is provided by the mid-stage.

In a further embodiment of any of the foregoing embodiments, the second compressor includes a rotor, and the multiple fluid-supplied areas include the rotor.

In a further embodiment of any of the foregoing embodiments, the turbine section comprises a fan drive turbine including a shaft, and the multiple fluid-supplied areas include the shaft.

In a further embodiment of any of the foregoing embodiments, a pressure ratio across the fan is less than about 1.45.

In a further embodiment of any of the foregoing embodiments, fan drive turbine is configured to drive the fan. A pressure ratio across the fan drive turbine is greater than about 5.

In a further embodiment of any of the foregoing embodiments, the first inlet is fluidly connected to the first outlet, and the second inlet is fluidly connected to the second outlet.

In a further embodiment of any of the foregoing embodiments, the multiple fluid-supplied areas include a component of the gas turbine engine.

In a further embodiment of any of the foregoing embodiments, the component is one of a vane, a blade and a clearance control device.

A further embodiment of any of the foregoing embodiments includes a bypass flow path arranged between core and fan nacelles, the second outlet fluidly being coupled to the bypass flow path.

In a further embodiment of any of the foregoing embodiments, the fan is configured to deliver a portion of air into the compressor section, and a portion of air into the bypass duct. A bypass ratio, which is defined as a volume of air passing to the bypass duct compared to a volume of air passing into the compressor section, is greater than about 6.

A method of designing a buffer system for a gas turbine engine according to an example of the present disclosure includes the steps of configuring a heat exchanger to define a first inlet and a first outlet fluidly coupled to each other and a second inlet and a second outlet fluidly coupled to each other, configuring the first inlet to receive air from first and second air sources that are selectively fluidly coupled to the first inlet, configuring the second inlet to receive air from a third air source fluidly that is coupled to the second inlet, and configuring the first outlet to provide cooled pressurized air to multiple fluid-supplied areas that are located remotely from one another and that are fluidly coupled to the first outlet. The multiple fluid-supplied areas include a bearing compartment of a gas turbine engine.

A further embodiment of any of the foregoing embodiments includes the steps of configuring a valve to be fluidly coupled to the first and second inlets, and designing the valve to regulate air from the first and second air sources, wherein the first and second air sources have different pressures.

A further embodiment of any of the foregoing embodiments includes the step of designing the first, second and third air sources to be different than one another.

A further embodiment of any of the foregoing embodiments includes the steps of configuring the first air source to provide air at a first pressure and temperature state, and configuring the second air source to provide air at a higher pressure and temperature state than the first air source.

A further embodiment of any of the foregoing embodiments includes the steps of configuring a compressor section to compress air and deliver it into a combustion section, the compressor section including first and second compressors; configuring the first compressor to provide the third air source; and configuring the second compressor to provide the second air source.

In a further embodiment of any of the foregoing embodiments, the step of configuring a compressor section includes arranging the first compressor to be upstream of the second compressor.

A further embodiment of any of the foregoing embodiments includes the steps of configuring a mid-stage to provide a flow path between the first and second compressors, and configuring the mid-stage to provide the first air source.

A further embodiment of any of the foregoing embodiments includes the step of designing the multiple fluid-supplied areas to include a component of the gas turbine engine. The component is at least one of a rotor of the second compressor and a shaft of a fan drive turbine driven by the compressor section.

A further embodiment of any of the foregoing embodiments includes the step of configuring the second outlet to be fluidly coupled to a bypass flow path. The bypass flow path is arranged between core and fan nacelles of a gas turbine engine.

A buffer system for a gas turbine engine according to an example of the present disclosure includes a heat exchanger configured for securing to a static structure. The heat exchanger has a first inlet and outlet and a second inlet and outlet, first and second air sources selectively fluidly coupled to the first inlet, and a third air source fluidly coupled to the second inlet and being provided by a first compressor. The first outlet is configured to provide a cooled pressurized fluid to multiple fluid-supplied areas fluidly coupled to the first outlet. The multiple fluid-supplied areas are located remotely from one another and include a bearing compartment.

In a further embodiment of any of the foregoing embodiments, the first air source is configured to provide air at a low pressure and temperature state, and the second air source is configured to provide air at a higher pressure and temperature state than the first air source.

In a further embodiment of any of the foregoing embodiments, the second air source is provided by a second compressor.

A further embodiment of any of the foregoing embodiments includes a valve configured for securing to the static structure, the valve being fluidly coupled to at least one of the first and second air sources. The valve is configured to regulate fluid flow from the first and second air sources to the heat exchanger.

In a further embodiment of any of the foregoing embodiments, the first inlet is fluidly connected to the first outlet, and the second inlet is fluidly connected to the second outlet.

BRIEF DESCRIPTION OF THE DRAWINGS

The disclosure can be further understood by reference to the following detailed description when considered in connection with the accompanying drawings wherein.

DETAILED DESCRIPTION

Figure 1:
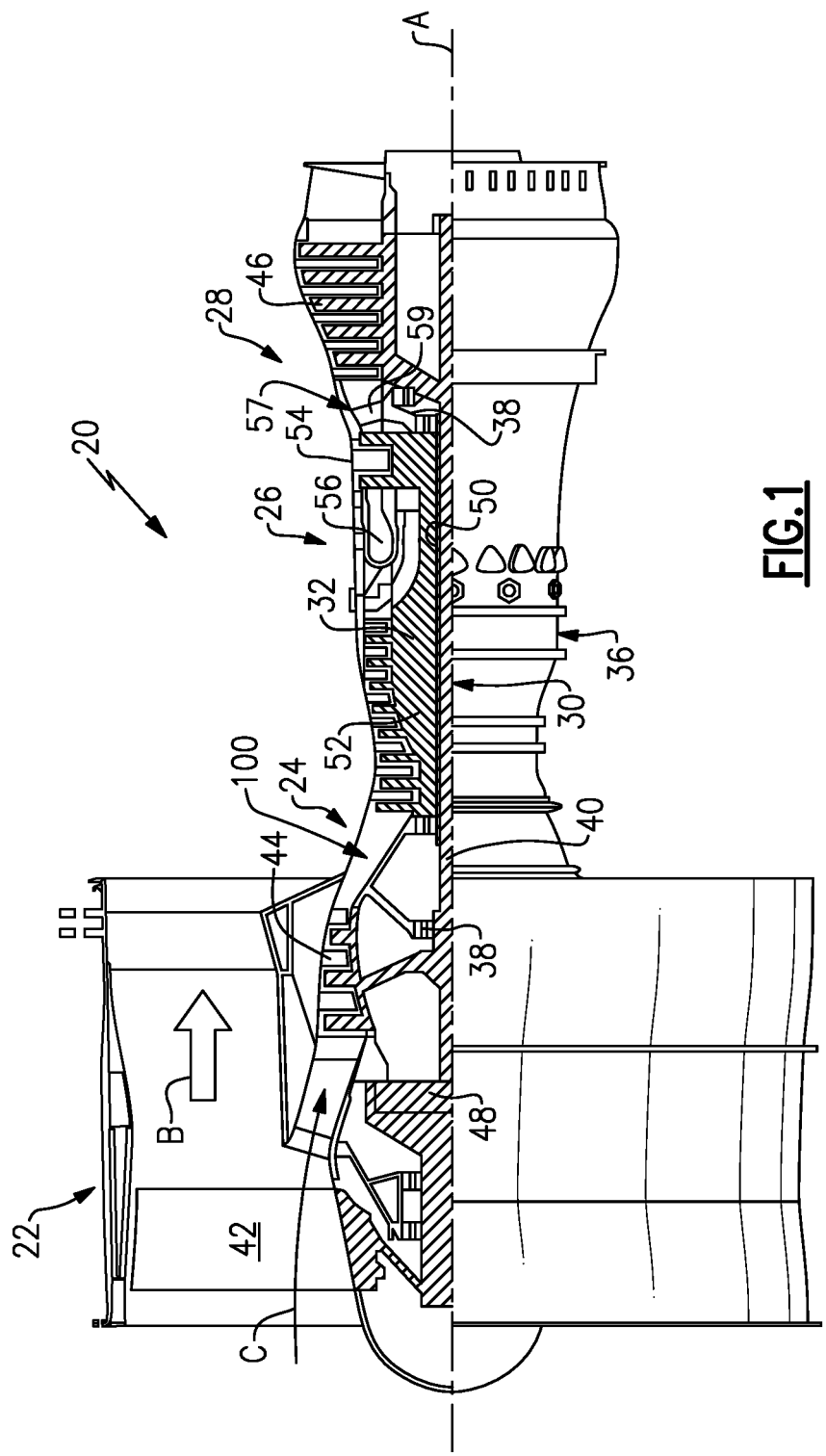
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Figure 2:
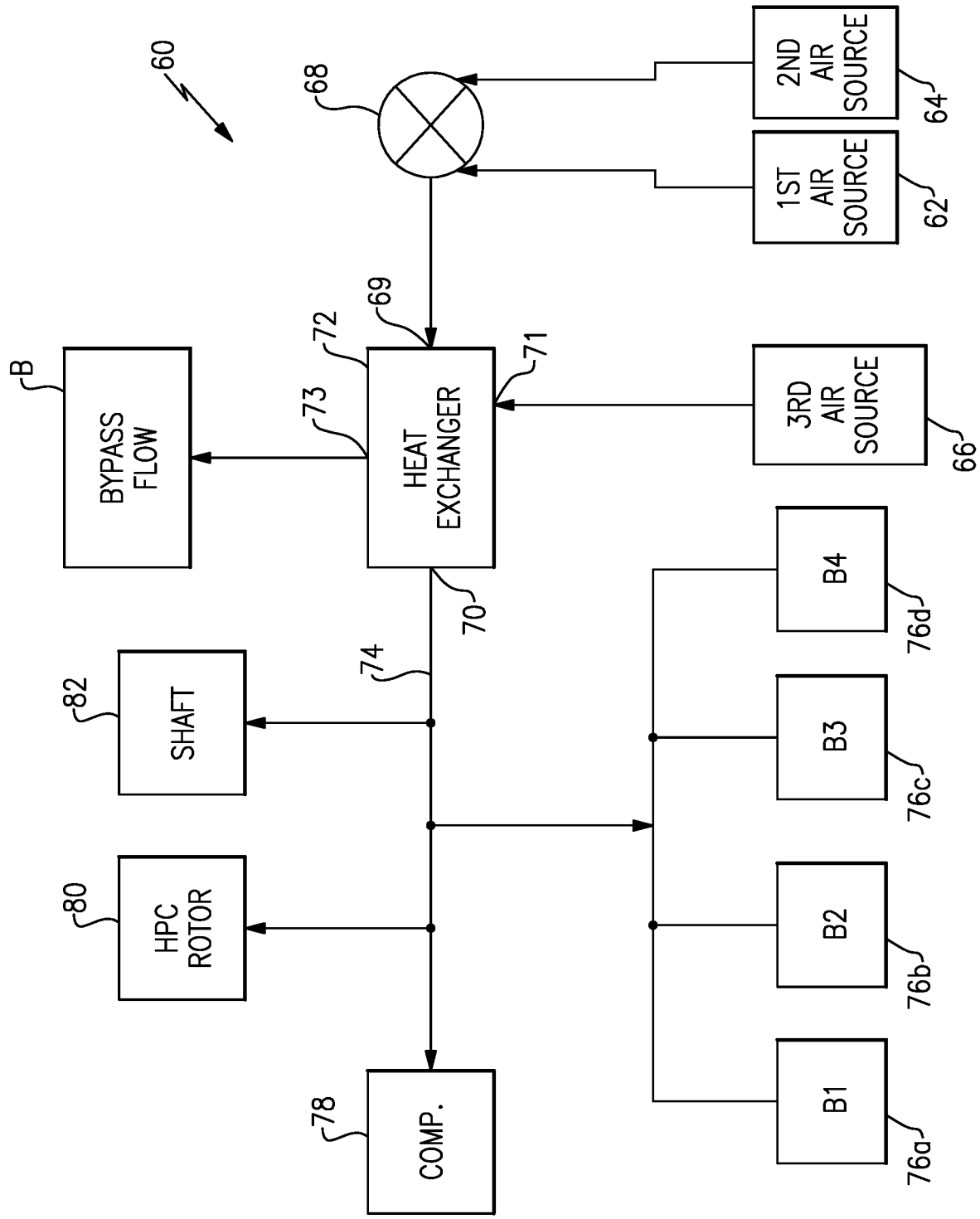
FIG. 2 is a schematic of an example buffer system for a gas turbine engine.

An example buffer system 60 is illustrated in FIG. 2. The system 60 includes first, second and third air sources 62, 64, 66, which are different than one another in the example. In one example, one of the first and second air sources 62, 64 is provided by the high pressure compressor 52. The third air source 66 is provided by the low pressure compressor 44. A pressurized region 100 between the exit of the low pressure compressor 44 and the entrance of high pressure compressor 52 is referred to as "mid-stage" (100 in FIG. 1) and is arranged fluidly with the low and high pressure compressors 44, 52 within the compressor section 24. In the example, the first and second air sources 62, 64 are provided within the high pressure compressor but could be representative of any two differing pressure supplies. Thus, in one example, the first air source 62 provides air at a low pressure and temperature state, the second air source 64 provides air at a higher pressure and temperature state, and the third air source 66 provides low pressure compressor air.

The first and second air sources 62, 64 are selectively fluidly coupled to a heat exchanger 72. In one example, a valve 68 is fluidly coupled to the first and second air sources 62, 64 and is configured to regulate fluid flow from the first and second air sources 62, 64 to the heat exchanger 72.

The heat exchanger 72 includes a first inlet and outlet 69, 70 and a second inlet and outlet 71, 73. The first outlet 70 provides cooled pressurized air 74. Passages are provided between respective inlets and outlets and are configured to transfer heat between the passages. In the example, the valve 68 is fluidly coupled to the first inlet 69, and the third air source 66 is fluidly coupled to the second inlet 71. The second outlet 73 is fluidly coupled to the bypass flow B so that low pressure compressor air expelled from the heat exchanger 72 may be used to supplement the thrust provided by the bypass flow B.

The first outlet 70 is fluidly coupled to multiple fluid-supplied areas that are located remotely from one another. The multiple fluid-supplied areas include multiple bearing compartments 76A, 76B, 76C, 76D. The multiple fluid-supplied areas may also include a component 78 that requires thermal conditioning, such as a vane, blade or clearance control device. The multiple fluid-supplied areas may also include a rotor 80 in the high pressure compressor 52 and/or a low pressure turbine section shaft 82.

In operation, a method of providing pressurized air to the gas turbine engine 10 includes selectively providing pressurized air from multiple air sources to the heat exchanger 72 to cool the pressurized air. The cooled pressurized air 74 is distributed to multiple fluid-supplied areas within the gas turbine engine. In one example, air from first and second air sources 62, 64, which are different from one another, are regulated. The pressurized air is cooled by providing low pressure compressor air from a third air source 66 to the heat exchanger 72. The cooled pressurized air 74 is distributed to multiple bearing compartments 76A, 76B, 76C, 76D, high pressure compressor section rotor 80, low pressure turbine section shaft 82, and/or a component 78.

Although an example embodiment has been disclosed, a worker of ordinary skill in this art would recognize that certain modifications would come within the scope of the claims. For that reason, the following claims should be studied to determine their true scope and content.

What is claimed is:

1. A method of designing a buffer system for a gas turbine engine, the method comprising the steps of:
   configuring a heat exchanger to define a first inlet and a first outlet fluidly coupled to each other and a second inlet and a second outlet fluidly coupled to each other;
   configuring the first inlet to receive air from first and second air sources that are selectively fluidly coupled to the first inlet;
   configuring the second inlet to receive air from a third air source that is fluidly coupled to the second inlet;
   configuring the first outlet to provide cooled pressurized air to multiple fluid-supplied areas that are located remotely from one another and that are fluidly coupled to the first outlet, the multiple fluid-supplied areas including a bearing compartment of the gas turbine engine;
   configuring a valve to be fluidly coupled to the first and second inlets;
   designing the valve to regulate air from the first and second air sources, wherein the first and second air sources have different pressures;
   designing the first, second and third air sources to be different than one another;
   configuring the first air source to provide air at a first pressure and temperature state;
   configuring the second air source to provide air at a higher pressure and temperature state than the first air source;
   configuring a compressor section to compress air and deliver the air into a combustion section, the compressor section including first and second compressors;
   configuring the first compressor to provide the third air source; and
   configuring the second compressor to provide the second air source.

2. The method as recited in claim 1, comprising the steps of:
   configuring a mid-stage to provide a flow path between first and second compressors; and
   configuring the mid-stage to provide the first air source.

3. The method as recited in claim 1, wherein the third air source is provided by the compressor section.

4. The method as recited in claim 1, wherein the step of configuring the compressor section includes arranging the first compressor to be upstream of the second compressor.

5. The method as recited in claim 4, wherein the step of configuring the compressor section includes arranging the first compressor and the second compressor downstream of a fan.

6. The method as recited in claim 5, wherein the third air source is provided by the compressor section.

7. The method as recited in claim 6, wherein a pressure ratio across the fan is less than 1.45.

8. The method as recited in claim 7, comprising the step of:
   configuring a turbine section to drive the compressor section, the turbine section including a fan drive turbine configured to drive the fan.

9. The method as recited in claim 8, wherein the bearing compartment includes a plurality of bearing compartments.

10. The method as recited in claim 8, wherein the multiple fluid-supplied areas include one of a vane, a blade and a clearance control device.

11. The method as recited in claim 1, comprising the steps of:
configuring a mid-stage to provide a flow path between the first and second compressors; and
configuring the mid-stage to provide the first air source.

12. The method as recited in claim 1, comprising the step of:
designing the multiple fluid-supplied areas to include a component of the gas turbine engine, the component being at least one of a rotor of the second compressor and a shaft of a fan drive turbine driven by the compressor section.

13. The method as recited in claim 12, wherein the multiple fluid-supplied areas includes the shaft.

14. The method as recited in claim 1, comprising the step of:
configuring the second outlet to be fluidly coupled to a bypass flow path, the bypass flow path being arranged between core and fan nacelles of the gas turbine engine.

15. The method as recited in claim 14, comprising the steps of:
configuring a fan to deliver a portion of air into the compressor section, and a portion of air into a bypass duct defining the bypass flow path; and
configuring a turbine section to drive the compressor section, the turbine section including a fan drive turbine configured to drive the fan.

* * * * *